Oct. 18, 1932.  J. OSTERTAG  1,883,856
WATER PURIFICATION FOR LOCOMOTIVES
Original Filed July 10, 1922
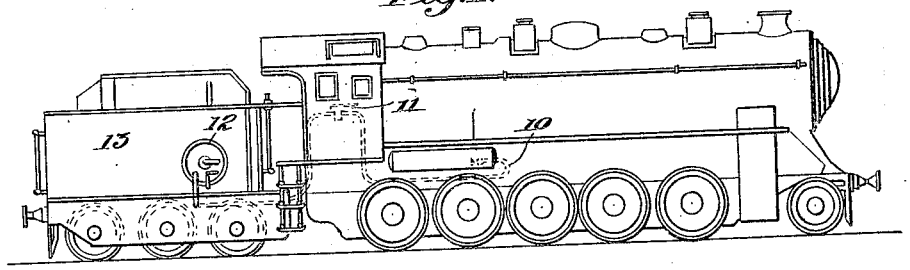
Inventor:
Julius Ostertag,
by Nathaniel Frucht
his Att'ys.

Patented Oct. 18, 1932

1,883,856

UNITED STATES PATENT OFFICE

JULIUS OSTERTAG, OF STUTTGART, GERMANY

WATER PURIFICATION FOR LOCOMOTIVES

Original application filed July 10, 1922, Serial No. 573,825, and in Polonia February 8, 1922. Patent No. 1,700,716, January 29, 1929. Divided and this application filed August 29, 1928. Serial No. 302,879.

This application is a division of application Ser. No. 572,825 filed July 10, 1922, issued as Patent No. 1,700,716, Jan. 29, 1929.

My present invention relates to a method and apparatus for purifying the feed water for locomotive steam boilers. My invention is especially suitable for feed water having a high carbonate hardness, particularly in cases where large quantities of insoluble salts are produced as a result of driving off carbon dioxide from the substances causing carbonate hardness, in addition to any such salts previously present in the unpurified feed water.

One object of my invention is to provide continuous removal from the boiler of an amount of solids during a period of time equal to the amount introduced in solution in the feed water during the same period of time.

Another object of my invention is to provide a simplified separator for effecting feed water purification in order to obtain a compact arrangement for use with locomotive and other portable steam boilers.

A third object of my invention is to conserve the heat and the water blown off from the boiler.

Another object of my invention is to provide an improved filtering means particularly adapted for locomotive use for removing the precipitated impurities.

An additional object is to provide means for easily and expeditiously cleaning the separator whenever such cleaning is necessary because of the relatively large quantity of precipitated sludge.

Other objects will be apparent from the detailed description following, in conjunction with the appended drawing, wherein:

Fig. 1 is a view of a locomotive and tender, showing my improved separator positioned in the tender.

Fig. 2 is an enlarged vertical section of the separator on the line 2—2 of Fig. 3.

Fig. 3 is an enlarged elevation of the front plate of the separator, showing the handle for agitating the contents of the separator.

Fig. 4 is a view showing a modified arrangement adapted for use with feed water having a high non-carbonate hardness, particularly where large quantities of easily soluble salts are produced as a result of chemical treatment for scale prevention, in addition to any such salts previously present in the unpurified feed water.

A locomotive or similar power plant having a portable boiler is necessarily limited insofar as available space for purification apparatus is concerned; I, therefore, prefer to employ the boiler itself as a reaction chamber, in order to eliminate the hardness, and to carry off the separated sludge to the feed water reservoir or tender through a blow-off pipe. A separator may then be placed within the feed water reservoir or tender to separate the sludge from the blow-off water, permitting the filtered blow-off water to pass through the reservoir or tender and mix with the feed water.

Referring to Fig. 1, a boiler blow-off 10, manually controlled by any well-known type of control valve 11, leads into the separator 12 positioned in one wall of the tender 13. The separator 12 is secured to the tender and is constructed of a front plate 15 and a rear cup-shaped body portion 16 positioned on opposite sides of a circular opening in the tender wall. The front plate 15 has an inlet port 17 cooperating with the blow-off pipe 10; the body portion 16 has a steam outlet port 18, and a water outlet 19.

Positioned within the rear end of the body portion 16 is filter 20 having filtering material 21 securely held between two plates 22 provided with water outlet perforations 23. Sludge-containing water is continuously or intermittently, as desired, blown off on the lower portion of the boiler through the pipe 10 and passes through inlet port 17 into the interior of the separator 12; the reduction from boiler pressure to atmospheric pressure causes vaporiaztion of a large portion of the blow-off water.

The steam formed escapes through the outlet port 18, this port being dimensioned to maintain sufficient pressure within the separator so as to slowly force the remaining blow-off water through filter 20, the perforations 23 permitting free passage of the filtered water into the tender through opening 19.

A rod 24 is rotatably positioned in a bearing member 25 extending through and securely fastened to the front plate 15, a handle 26 providing means for turning the rod 24 and thus rotating a paddle 27 fixed thereon. If desirable, the filter 20 may also be rotated at the same time, but preferably the filter remains fixed in position during the rotation of the paddle. A valve-controlled drain 28 is provided at the lower portion of the front plate 15.

The steam passing through steam outlet 18 is condensed within the water in the tender; the feed water thus receives the steam and the filtered blow-off water, the sludge remaining within the interior of the separator 12. The body portion 16 is continuously in contact with the cool feed water and helps to condense the steam. The outlet 18 and the cooling effect of the body portion 16 co-operate to prevent a rise of steam pressure to a point where the sludge might be forced through the filter into the feed water.

The separator 12 must necessarily remain in service for long periods of time under the rigorous requirements of portable boiler operation. Handle 26 may, therefore, be periodically turned to agitate the sludge within the interior of the separator, thus removing any sludge deposited on the filter surface and on the walls of the body portion 15 and suspending the sludge within the water in the separator interior. The drain pipe 28 is then opened until clear water appears, thus cleaning and rinsing the separator preparatory to additional service.

Where the amount of easily soluble salts is so high that it is preferable to dispense with the filtration and conserve as much heat as possible by direct heat transfer, the modified arrangement shown in Fig. 4 is employed. The blow-off pipe 10 is connected to a condenser worm 29 located within the tender 13, the blow-off water giving up its heat to the surrounding tender water and passing through the worm to an outlet 30, positioned in any convenient location, to waste. Any well-known form of heat transfer apparatus may be utilized instead of the worm 29. In using this modification, it is preferable to continuously blow off water in order to continuously maintain the concentration within the boiler at a desirable low point by removing approximately the same amount of solids during a period of time as is introduced in solution in the feed water during the same period of time. Chemicals are added to the feed water whenever the tender is filled.

While I have herein shown and described preferable embodiments of my invention, I do not wish to be understood as limiting myself to the precise details illustrated, since changes may be made in the method and the apparatus disclosed without departing from the principle of my invention as defined in the appended claims.

Having thus described my invention, I claim:

1. A continuous purification system for portable boilers, comprising a feed water supply tank, a sludge separator therein, a boiler blow-off connection for conducting sludge-containing blow-off water to said separator, a steam outlet in the separator, a filter within the separator, and a water outlet in the separator for permitting exit of the filtered water into the supply tank.

2. A continuous purification system for portable boilers, comprising a feed water supply tank, a sludge separator therein, a boiler blow-off connection for conducting sludge-containing blow-off water to said separator, a steam outlet in the separator, a filter within the separator, a water outlet in the separator for permitting exit of the filtered water into the supply tank, an agitator for agitating the contents within the separator, and a drain for the separator.

3. In combination, a locomotive boiler, a tender containing feed water, a blow-off pipe connected to the boiler, a sludge separator within the tender and in heat exchange contact with the feed water, valve means for regulatably reducing the pressure of the blow-off water entering the separator to generate steam, said steam and sludge-separated blow-off water being added to the feed water.

4. A sludge separator comprising a casing an inlet adapted to be connected to a boiler blow-off pipe, a restricted steam outlet, a relatively large water outlet, and a filter covering said outlet.

5. A sludge separator comprising a casing an inlet adapted to be connected to a boiler blow-off pipe, a restricted steam outlet, a relatively large water outlet, a filter covering said outlet, an agitator for agitating the contents within the separator, and a drain connection for the separator.

6. A sludge separator comprising a casing an inlet conduit leading into said casing and adapted to be connected to a boiler blow-off pipe, a restricted steam outlet, a relatively large water outlet, a filter covering said outlet, an agitator for agitating the contents within the separator, manual means for operating the agitator, and a drain connection for the separator.

In testimony whereof I hereunto affix my signature.

JULIUS OSTERTAG.